(12) United States Patent
Eggert et al.

(10) Patent No.: US 8,576,531 B2
(45) Date of Patent: Nov. 5, 2013

(54) MULTIPHASE ELECTRIC CIRCUIT FOR SHUTTING DOWN A CURRENT CONDUCTED OVER RESPECTIVELY ONE AC POWER CONTROLLER

(75) Inventors: Bernhard Eggert, Berlin (DE); Bernd Moll, Berlin (DE); Hartmut Schuett, Berlin (DE); Wolfgang Lasse, Berlin (DE)

(73) Assignee: GE Energy Power Conversion Technology Limited, Warwickshire (GB)

( * ) Notice: Subject to any disclaimer, the term of this patent is extended or adjusted under 35 U.S.C. 154(b) by 399 days.

(21) Appl. No.: 12/461,591

(22) Filed: Aug. 17, 2009

(65) Prior Publication Data

US 2011/0038086 A1 Feb. 17, 2011

(51) Int. Cl.
  *H02H 9/08* (2006.01)
  *H02H 3/00* (2006.01)
  *H02H 3/22* (2006.01)

(52) U.S. Cl.
  USPC .................................. 361/93.9; 2/42; 2/111

(58) Field of Classification Search
  USPC ...................... 361/93.9, 42, 2, 111
  See application file for complete search history.

(56) References Cited

U.S. PATENT DOCUMENTS 5,734,256 A * 3/1998 Larsen et al. ................. 323/207
2007/0278797 A1* 12/2007 Flannery et al. ................ 290/44

FOREIGN PATENT DOCUMENTS

| DE | 1588689 | | 6/1970 |
| DE | 3118284 | | 11/1982 |
| JP | 08016258 | * | 1/1996 |
| JP | 2004-364471 | * | 12/2004 |

OTHER PUBLICATIONS

Office Actin for corresponding European patent application No. 09001358.2 dated Jul. 13, 2012 with English translation.

* cited by examiner

*Primary Examiner* — Jared Fureman
*Assistant Examiner* — Lucy Thomas
(74) *Attorney, Agent, or Firm* — Parks IP Law LLC

(57) ABSTRACT

In one embodiment of the present invention, a multiphase electric circuit is disclosed for shutting down a current conducted over respectively one AC power controller. The neutral points of the voltage systems connected to the phases are not connected to each other via a neutral conductor. The AC power controller of each phase is provided with two thyristors. A single series connection is connected parallel to all phases, which series connection comprises a capacitor and a number of parallel-connected quenching switches corresponding to the number of phases. The capacitor can be charged up via a diode bridge and a transformer.

16 Claims, 4 Drawing Sheets

MULTIPHASE ELECTRIC CIRCUIT FOR SHUTTING DOWN A CURRENT CONDUCTED OVER RESPECTIVELY ONE AC POWER CONTROLLER

The invention relates to a multiphase electric circuit for shutting down a current conducted over respectively one AC power controller, wherein the neutral points of the voltage systems connected to the phases are not connected to each other via a neutral conductor, and wherein the AC power controller of each phase is provided with two thyristors. The invention also relates to a method for shutting down a current conducted over a thyristor of an AC power controller.

Conducting currents over the thyristors of AC power controllers, for example, is known for connecting two electrical grids or for connecting a grid and a motor or generator load. If a malfunction occurs in such an electric circuit, the currents flowing over the thyristors can increase to multiple times their nominal current values. To avoid damages, it is known to shut down the thyristors purposely within one half of a grid period. The thyristors are furthermore frequently over-dimensioned.

It is the object of the present invention to provide a circuit as well as a method of the aforementioned type, which allow for a quick shutdown of the thyristor with little expenditure.

This object is solved according to the invention with the circuit as disclosed in one of the claim 1 or 5 and with the method as disclosed in one of the claim 10 or 11.

With the electric circuit according to the invention, the neutral points of the voltage systems connected to the phases are not connected via a neutral conductor to each other, and the AC power controller of each phase is provided with two thyristors. A single series connection is parallel connected to all phases, wherein this series connection consists of a capacitor and a number of parallel-connected quenching switches, wherein this number coincides with the number of phases. According to the inventive method, one of the quenching switches is connected conducting and a current is driven from the capacitor over the quenching switch, which thus counteracts the current conducted over the associated thyristor. The current conducted over the thyristor is consequently reduced to zero and the thyristor is shut down.

At the start of the above-explained action, the capacitor must be charged up to a negative voltage. According to the invention, the capacitor can be charged to this voltage via a diode bridge and a transformer, wherein the capacitor preferably is connected via the diode bridge and the transformer to two phases of one of the two grids. The capacitor can be charged with the aid of this arrangement to the desired negative voltage for the starting condition.

It is furthermore also possible that in order to charge the capacitor, the quenching switch and a thyristors of the AC power switch that is connected conducting can simultaneously also be connected conducting. In that case, the polarity of the capacitor must still be reversed.

It is particularly advantageous if the circuit according to the invention is used for connecting an electric power grid and a generator, in particular used in a wind power generating system.

Additional features as well as options for use and advantages of the invention follow from the description below of exemplary embodiments of the invention, which are shown in the Figures of the drawing. All features described or shown either by themselves or in any optional combination form the subject matter of the invention, regardless of their combination in the patent claims or the references back, as well as independent of their formulation and/or representation in the description and/or the drawing.

FIG. 1 shows a three-phase circuit for which the phases of two electrical grids are connected via respectively one AC power controller. The neutral points of the voltages systems on the input/output side, which are connected to the phases, in this case are not connected via a joint neutral conductor.

Figure 1:
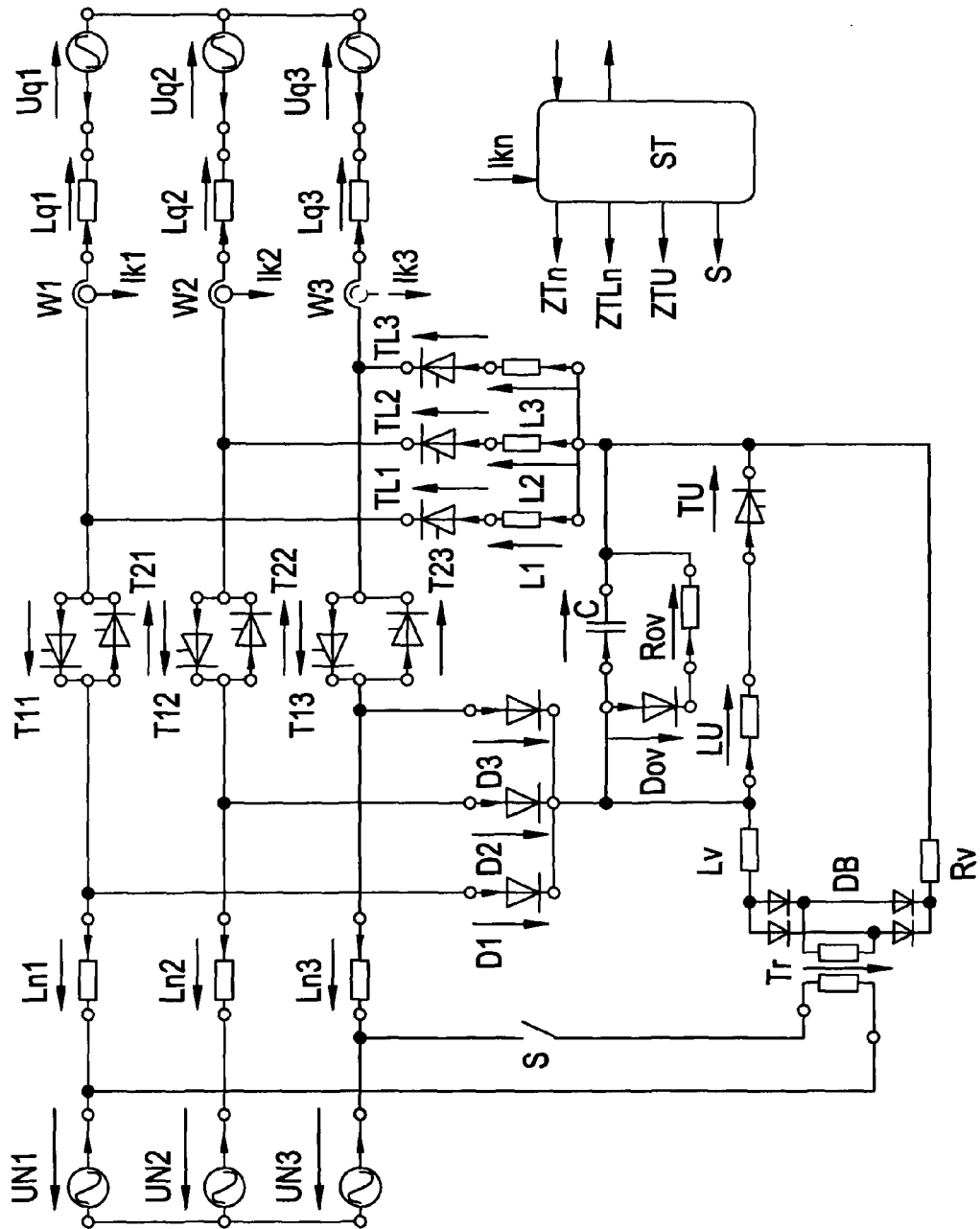
FIGS. 1 to 3 show schematic connection diagrams of exemplary embodiments of an electric circuit according to the invention.

The two grids are represented by the grid voltages $Un1$, $Un2$, $Un3$ and $Uq1$, $Uq2$, $Uq3$, wherein both grids are assigned a grid inductance $Ln1$, $Ln2$, $Ln3$ and $Lq1$, $Lq2$, $Lq3$ in each of their phases. One of the two grids can also be a passive motor or generator load. The AC power controller is respectively represented by the two thyristors $T11$, $T12$, $T13$ and $T21$, $T22$, $T23$ that are switched parallel to each other and connected conducting in opposite directions. These thyristors are viewed in the following as switches which can be switched to be conducting in throughput direction by an ignition pulse and, following a reversal of the direction for the current conduction, act inhibiting to block the current conduction and thus shut down the current flow.

The grid voltage $Un1$, the associated grid inductance $Ln1$, the two parallel-switched thyristors $T11$, $T21$, the grid inductance $Lq1$ associated with the second grid and the grid voltage $Uq1$ form a series connection. The same applies to the other two phases of the two grids. The phases of both grids are respectively connected at a neutral point, but the two neutral points are not connected, meaning there is no neutral conductor.

All thyristors are assigned a quenching arrangement consisting of a series connection of a capacitor C and a parallel circuit, comprising respectively one coil $L1$, $L2$, $L3$ and respectively one quenching switch $TL1$, $TL2$, $TL3$. Via the diodes $D1$, $D2$, $D3$, this quenching arrangement is parallel-connected to the thyristors $T11$, $T21$ and/or $T12$, $T22$ and/or $T13$, $T23$. The quenching arrangement is furthermore provided with a series connection of a reversing thyristor TU and a reversing coil LU, which are parallel-connected to the capacitor C. The quenching switches $TL1$, $TL2$, $TL3$ can be thyristors.

Also provided is a control ST for generating the output signals $ZTn$, $ZTLn$, $ZTU$ for activating the thyristors, the quenching switch and the reversing thyristors. In each phase, a current sensor $W1$, $W2$, $W3$ measures a load current flowing between the two grids and transmits a corresponding signal to the control ST. The control ST is furthermore connected via bidirectional lines to other control or regulating systems.

For the example considered in the following represents only of one of the three phases of the circuit according to FIG. 1, namely the phase with the thyristors $T11$, $T21$. However, the same applies analog to the other two phases. We furthermore assume that the thyristor $T21$ of the considered phase is conducting and thus carries a load current. Also assumed is that the capacitor C is charged negatively, meaning that the voltage present at the capacitor C flows counter to the direction shown with the voltage arrow in FIG. 1.

In this operating state, a malfunction occurs that results in an overload current which can amount to a multiple of the load current. This overload current, which flows over the thyristor $T21$, is measured by the current sensor $W1$. If the overload current exceeds a prescribed threshold value, it leads to the quenching of the thyristor 21 by the quenching arrangement described in the following.

As soon as the measured overload current reaches the threshold value, the control ST stops transmitting further ignition pulses to the thyristors T11, T21 and the quenching switch TL1 is simultaneously switched conducting by the control ST. As a result, the capacitor C together with the coil L1 forms a reversing circuit. An increasing current then flows in the reverse direction via the capacitor C, the coil L1, the quenching switch TL1 and the thyristor T21. This reverse-flowing current counteracts the overload current conducted by the thyristor T21. Once this reverse-flowing current driven by the capacitor C reaches the value of the overload current, the thyristor T21 becomes non-current carrying. The overload current carried by the thyristor T21 is completely compensated for and thus becomes zero. At this point in time, the total overload current is no longer conducted over the thyristor T21 but over the capacitor C and the thyristor T21 is shut down.

With the process described so far, the capacitor C is continuously charged by the reverse-flowing current flowing over the quenching switch TL1. As a result of the series connection consisting of the grid inductance Ln1, the diode D1, the capacitor C, the coil L1, the quenching switch TL1 and the grid inductance Lq1, the voltage at each of the two grid inductances Ln1, Lq1 decreases continuously and, at some point, changes polarity. It is assumed that the two grid voltages Un1 and Uq1 remain essentially constant during the complete process, which is synonymous with the overload current that flows over the quenching switch TL1 also becoming smaller and smaller. At some point, the overload current reaches zero and the quenching switch TL1 is shut down.

A condition is thus reached in which the thyristor T21 as well as the quenching switch TL1 is shut down and the overload current becomes zero. In contrast to the starting condition, however, the capacitor C is no longer negatively charged, but is positively charged.

To return to the starting condition, the reversing thyristor TU is switched by the control ST to be conducting. The capacitor C is thus charged negatively via the reversing coil LU and counter to the direction shown with the voltage arrow in FIG. 1. This charge reversal is continued until the capacitor C again has the negative voltage of the starting condition. If applicable, the series connection of the reversing thyristor TU and the reversing coil LU can contain an additional reversing resistor (not shown herein) for the purpose of attenuation.

If applicable, a series connection consisting of a diode Dov and a resistor Rov can be switched parallel to the capacitor C, wherein this series connection acts as voltage limiter for the capacitor C. In place of the above-explained series connection, a varistor can also be connected parallel to the capacitor C.

Insofar as the thyristor T11 is connected conducting and thus carries a load current, the thyristor T11 is shut down in the manner as explained and with the aid of the quenching arrangement. It can be pointed out here that the thyristors T11, T12, T13 can also be replaced with diodes. It can furthermore be pointed out that—owing to the missing neutral conductor—that the sum of all phase currents must be equal to zero. As a result, the currents in two phases always flow in the same direction and the current in the third phase flows in the opposite direction. All three phases can be shut down, for example, by shutting down the thyristors of the two phases with the current flowing in the same direction, even if the thyristor with the current flowing in the opposite direction is still connected conducting.

As explained in the above, we assume a starting condition where the capacitor C is negatively charged. For this starting condition, the voltage value of the negative charge is selected such that the peak value of the explained reversing current is higher than the maximum possible overload current.

The circuit according to FIG. 1 comprises a switch S, an AC current transformer Tr, a diode bridge DB as well as a series resistor Rv and a series coil Lv for the initial charging of the capacitor C. The switch S connects the primary coil for the transformer Tr to two of the three phases of the first grid Un1, Un2, Un3. The secondary coil of the transformer Tr is connected to the center connecting points of the diode bridge DB while the outer connecting points of the diode bridge DB are switched parallel to the capacitor C. The series resistor Rv and, if applicable, also the series coil Lv can be connected in series between these outer connecting points of the diode bridge DB and the capacitor C.

The transformer Tr is used for the potential separation. The switch S can be turned on and off by the control ST. The diode bridge DB functions to rectify the secondary voltage of the transformer Tr and to generate the required polarity of the voltage, made available by the transformer Tr and used for the negative charging of the capacitor C. The charging current generated when charging the capacitor C can be limited by the series resistor Rv and, if applicable, also by the series coil Lv. The series resistor Rv furthermore causes an uncoupling of the described charging device during the quenching operation with respect to the changing voltage at the capacitor C.

For the initial charging of the capacitor C, the switch S is closed by the control ST, thus causing the transformer Tr to generate a charging current which flows via a series connection consisting of the secondary coil for same, the diode bridge DB, the series resistance Rv, the capacitor C and the series coil Lv and negatively charges up the capacitor C. Once the capacitor C has reached the desired negative voltage for the starting condition, this negative voltage is maintained constantly via the closed switch S and the transformer Tr. In this condition, only a maintenance current that is lower than the charging current flows via the above-described series connection.

Following a quenching operation—as explained in the above—the capacitor C is negatively charged once more with the aid of the reversing thyristor TU and the reversing coil LU. Once the capacitor C has reached the desired negative voltage, this negative voltage can again be maintained with the aid of the previously explained charging device.

Figure 2:
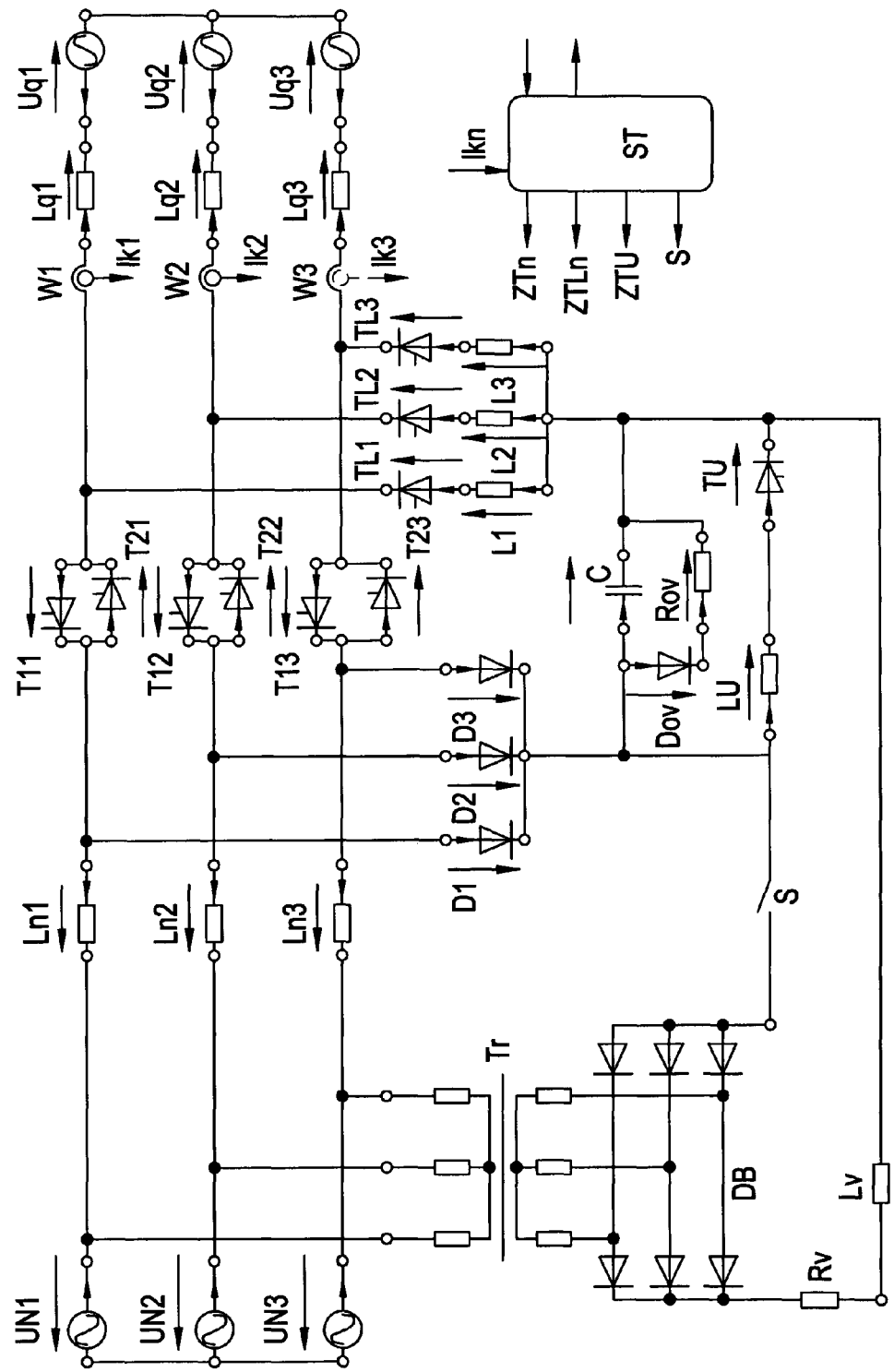

FIG. 2 shows a circuit which for the most part coincides with the circuit shown in FIG. 1. For that reason, only those components and modes of operation of the circuit according to FIG. 2 are explained in the following, which differ from the circuit shown in FIG. 1, wherein we point to the circuit in FIG. 1 for all components and modes of operation that coincide with the ones shown for the circuit according to FIG. 2.

For the initial charging of the capacitor C, FIG. 2 shows a three-phase transformer Tr, a switch S, a diode bridge DB, as well as a series resistor Rv and a series coil Lv. The primary coils of the transformer Tr are connected to the phases of the first grid Un1, Un2, Un3. The secondary coils of the transformer Tr are connected to the center connecting points of the diode bridge DB while the outer connecting points of the diode bridge DB are connected parallel to the capacitor C by the switch S. The series resistor Rv and, if applicable, also the series coil Lv can be connected between these outer connecting points of the diode bridge DB and the capacitor C.

The transformer Tr is used for the potential separation. The switch S can be switched on and off by the control ST. The diode bridge DB functions is used for the rectifying, and the polarity of the voltage made available by the transformer Tr and necessary for the negative charging of the capacitor S is generated in this way. The charging current appearing during the charging of the capacitor C can be limited by the series resistor Rv and, if applicable, also by the series coil Lv. The series resistor Rv furthermore causes a decoupling of the above-described charging device during a quenching operation, relative to the changing voltage at the capacitor C.

For the initial charging of the capacitor C, the switch S is closed by the control ST, thereby causing the transformer Tr to generate a charging current that flows over a series connection consisting of the secondary coil of same, the diode bridge DB, the series resistor Rv, the capacitor C and the series coil Lv, wherein this charging current negatively charges the capacitor C. Once the capacitor C has reached the negative voltage desired for the starting condition, this negative voltage is maintained constantly via the closed switch S and the transformer Tr. In this state, only a maintenance current that is smaller than the charging current flows over the above-described series connection.

Following a quenching operation, the capacitor C is negatively charged once more with the aid of the reversing thyristor TU and the reversing coil LU, as explained in the above. Once the capacitor C has reached the desired negative voltage, this negative voltage can again be maintained with the aid of the previously explained charging device.

Figure 3:
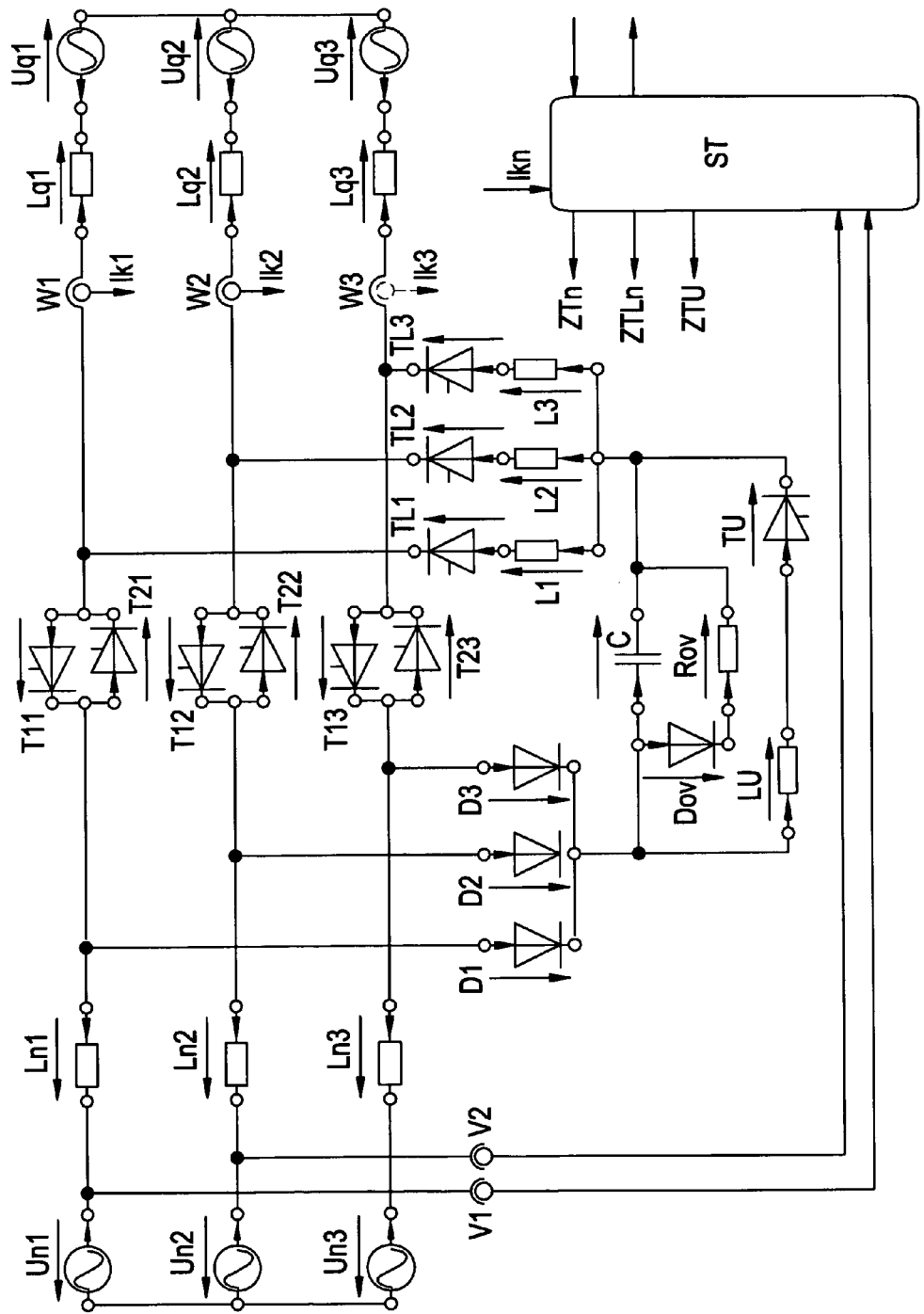

FIG. 3 shows a circuit that for the most part coincides with the circuit shown in FIG. 1. For that reason, only those components and modes of operation for FIG. 3 are explained in the following, which differ from the circuit shown in FIG. 1. We point to the circuit shown in FIG. 1 for all coinciding components and modes of operation of the circuit according to FIG. 3.

For the initial charging of the capacitor C, the circuit according to FIG. 3 essentially shows those components, which are provided for the quenching operation and have already been explained in connection with FIG. 1. In addition, only two sensors V1, V2 are provided that can be used to measure the voltage at two phases of the first grid voltage Un1, Un2, Un3.

We now assume that the mains voltage Un1 is detected as positive voltage by the sensor VI. If, given these conditions, only the thyristor T11 and the quenching switch TL1 are simultaneously connected conducting in the same direction by the control ST, a current flows from the grid voltage Un1 via the parallel connection for the grid voltages Un2, Un3 of the associated grid inductances Ln2, Ln3 and the downstream arranged diodes D2, D3 to the capacitor C and from there via the quenching switch TL1, the thyristor T11 and the grid inductance Ln1 back again to the circuit for the mains voltage Un1. The capacitor C is charged up with this current.

It is possible to charge up the capacitor C with the aid of a single charging operation, as explained in the above. However, it is also possible to use several such charging operations during several grid phases for charging up the capacitor C. For the second option, the charging current flowing during the charging operation can be selected to be lower than with the first option.

The above-described charging of the capacitor C results in a positive voltage at the capacitor C. Once the capacitor C is charged up to the desired voltage, the reversing thyristor TU is switched to be conducting by the control ST, so as to reverse in this way the polarity of the voltage at the capacitor C.

Once the negative voltage required for the above-explained starting condition is reached at the capacitor C, a circuit as shown in FIG. 1 or 2 can be used to maintain this negative voltage, wherein a battery can alternatively also be used.

Figure 4:
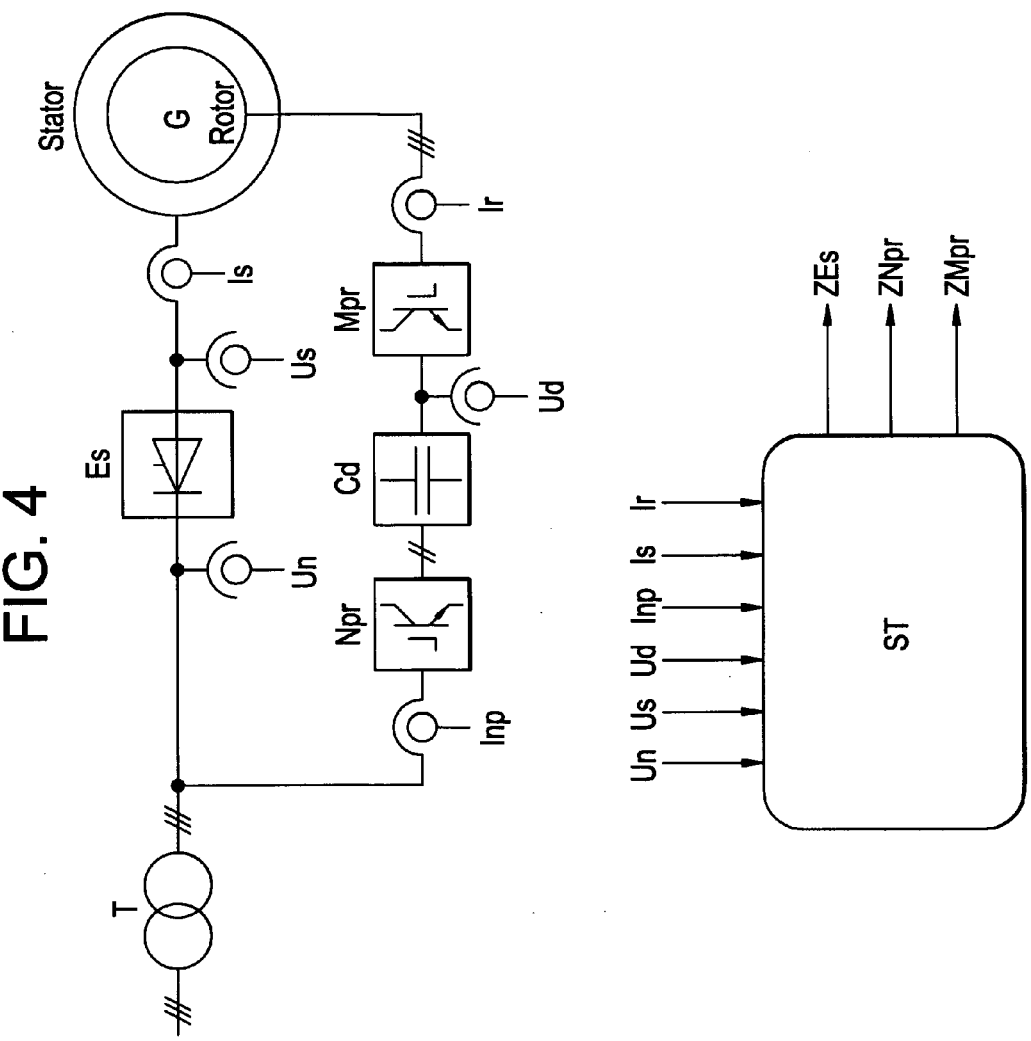
FIG. 4 shows a schematic connection diagram of an exemplary embodiment of an electric circuit according to the invention, which comprises a dual-fed asynchronous generator with grid-connected stator.

FIG. 4 shows an electric circuit for a dual-fed asynchronous generator with grid-connected stator. This circuit is used in particular for power-generating plants such as wind-power, hydroelectric power or gas-turbine power generating plants.

A three-phase power grid is connected to a transformer T, along with a stator switch Es, which in turn is connected to the stator of an asynchronous generator G. The stator switch Es can be one of the electric circuits shown in FIGS. 1 to 3. The stator switch Es furthermore comprises at least one of the following thyristors T11, T21, T12, T22, T13, T23, shown in FIGS. 1 to 3.

A voltage sensor for measuring the grid voltage Un is provided on the grid side of the stator circuit Es. An additional voltage sensor is provided on the stator side of the stator switch Es for measuring the stator voltage Us. A current sensor is furthermore provided on this stator side, which measures the stator current Is flowing over the stator switch Es.

A grid converter Npr is connected to the connecting points on the transformer T and the stator switch Es, which grid converter is connected via an intermediate circuit Cd to a motor converter Mpr. The motor converter Mpr is furthermore connected to the rotor of the asynchronous generator G. The grid converter Npr and the motor converter Mpr can be configured optionally and, in particular, can be circuits comprising a plurality of semiconductor elements such as diodes or transistors or the like. The intermediate circuit Cd is provided for storing a direct voltage and comprises, in particular, one or several capacitors.

A current sensor is provided on the grid side of the grid converter Npr for measuring the current Inp that flows over the grid converter Npr. An additional current sensor is provided on the machine side of the motor converter Mpr for measuring the rotor current Ir that flows over the motor converter Mpr. A voltage sensor is provided between the motor converter Mpr and the intermediate circuit Cd, which can be used to measure the intermediate circuit voltage Ud.

The measuring signals from the grid voltage Un, the stator voltage Us, the intermediate circuit voltage Ud of the current Inp, the stator current Is and the rotor current Ir flowing over the grid converter Npr are supplied to a control ST as input signals. The control ST generates several output signals ZES, ZNpr, ZMpr, which can be used to trigger the stator switch Es, the grid converter Npr and the motor converter Mpr.

During the normal operation of this circuit, the stator switch Es is connected conducting. If the rotor is put into a rotational movement as a result of an external force, e.g. wind or water, then a voltage is induced in the stator, which is fed via the stator switch Es into the power supply grid. The adaptation, in particular the synchronization of the voltage induced in the stator to the grid voltage Un of the power grid is effected by the control ST, through a corresponding triggering of the grid converter Npr and the motor converter Mpr.

If a malfunction occurs in the power grid and if this malfunction is detected by the control ST, then the stator switch Es that is realized by one of the electric circuits shown in FIGS. 1 to 3 is switched with the aid of the control ST as soon as possible to the inhibiting state. The stator switch Es in the process can be switched from the conducting state to the inhibiting state even when under a load and in particular if a malfunction occurs in the power grid. The switching to the inhibiting state in this case is triggered by the control ST upon reaching a specified intermediate circuit voltage Du, a specified stator current Is, or another specified threshold value.

As a result, the stator of the asynchronous generator G is separated from the transformer T and thus from the power supply grid, and the stator current Is ceases to flow. A further charging of the intermediate circuit Cd is therefore no longer possible via the stator and the rotor. The components of the two converters Mpr, Npr are therefore not in danger and it is also not necessary to stop the operation of the two converters Mpr, Npr.

When detecting a malfunction in the power grid, the grid-side converter Npr is triggered by the control ST, such that it feeds a blind current into the power grid. The two converters Mpr, Npr are furthermore controlled by the control ST in such a way that a desired effective current is generated, which is required for maintaining the intermediate circuit voltage Ud.

Following the interruption of the stator current Is by the stator switch Es, the rotor-side current converter Mpr is activated by the control ST, such that the magnetic flow to the malfunctioning component of the power supply grid is synchronized. The control in the process monitors the grid voltage Un and the stator voltage Us. Once the difference between the two voltages becomes zero, which is the same as the voltage at the stator switch Es becoming zero, the stator switch Es is again switched conducting by the control ST. The stator current Is subsequently is controlled by the control ST together with the rotor-side converter Mpr in such a way that the requirements of the grid operator are met for supplying power in case of a malfunction.

The invention claimed is:

1. A multiphase electric circuit for shutting down a current, the circuit comprising:
    an AC power controller, configured to conduct current, provided in each phase of the multiphase electric circuit, the phases of the multiphase electric circuit being connected to two voltage systems, each of the voltage systems having a neutral point and the neutral points of the two voltage systems are not connected to each other by way of a neutral connector, each AC power controller including two thyristors; and
    a quenching arrangement including a single series connection of a capacitor and a parallel circuit having a number of parallel-connected quenching switches, the number of quenching switches corresponding to the number of phases,
    wherein the capacitor of the quenching arrangement is connected on one side to the number of parallel-connected quenching switches of the series connection and on the other side to a number of parallel-connected diodes, the number of parallel-connected diodes corresponds to the number of phases,
    wherein each of the parallel-connected diodes is connected to one phase of the multiphase electric circuit on one side of the two thyristors of the AC power controllers,
    wherein each of the parallel-connected quenching switches of the quenching arrangement is connected to one phase of the multiphase electric circuit on the other side of the two thyristors of the AC power controllers, and
    wherein the capacitor is connected to a diode bridge for charging of the capacitor.

2. A multiphase electric circuit according to claim 1, further comprising a transformer, wherein the transformer is coupled to the diode bridge, and wherein at least a switch is provided on a primary side or on a secondary side of the transformer, the switch being usable to interrupt a connection to at least two of the phases of the multiphase electric circuit.

3. A multiphase electric circuit according to claim 2, wherein the transformer is an AC transformer or a rotary current transformer.

4. A multiphase electric circuit according to claim 1, wherein at least one of a series resistor and a series coil is connected between the diode bridge and the capacitor.

5. A multiphase electric circuit according to claim 1, wherein the AC power controller is connected between two electrical grids or between an electrical grid and a load.

6. A multiphase electric circuit according to claim 5, wherein a power main is provided as electrical grid and the load is a generator.

7. A multiphase electric circuit according to claim 6, wherein the load is a load of a wind power generating plant.

8. A multiphase electric circuit according to claim 2, wherein an AC transformer or a rotary current transformer is provided.

9. A multiphase electric circuit for shutting down a current, the circuit comprising:
    an AC power controller, configured to conduct current, provided in each phase of the multiphase electric circuit, the phases of the multiphase electric circuit being connected to two voltage systems, each of the voltage systems having a neutral point and the neutral points of the two voltage systems are not connected to each other by way of a neutral connector, each AC power controller including two thyristors;
    a quenching arrangement including a single series connection of a capacitor and a parallel circuit having a number of parallel-connected quenching switches, the number of quenching switches corresponding to the number of phases,
        wherein the capacitor of the quenching arrangement is connected on one side to the number of parallel-connected quenching switches of the series connection and on the other side to a number of parallel-connected diodes, the number of parallel-connected diodes corresponds to the number of phases,
        wherein each of the parallel-connected diodes is connected to one phase of the multiphase electric circuit on one side of the thyristors of the AC power controllers, and
        wherein each of the parallel-connected quenching switches of the quenching arrangement is connected to one phase of the multiphase electric circuit on the other side of the thyristors of the AC power controllers; and
    a control configured such that, for charging of the capacitor, one of the quenching switches and one of the thyristors of one of the AC power controllers having the same direction, are simultaneously switchable into their conductive state.

10. A multiphase electric circuit according to claim 9, wherein the control is further configured such that the quenching switch and the thyristor that is connected conducting in the same direction is switchable to be conducting only if the grid voltage associated with the thyristor is positive.

11. A multiphase electric circuit according to claim 9, wherein the control is further configured such that the quenching switch and the thyristor that is connected conducting in the same direction is connectable so as to be conducting several times in successively following grid periods.

12. A multiphase electric circuit according to claim 10, wherein the control is further configured such that the quenching switch and the thyristor that is connected conducting in the same direction is connectable so as to be conducting several times in successively following grid periods.

13. A method for shutting down a current in a multiphase electric circuit having an AC power controller configured to conduct current provided in each phase of the multiphase electric circuit, the phases of the multiphase electric circuit being connected to two voltage systems, each of the voltage systems having a neutral point and the neutral points of the two voltage systems are not connected to each other by way of a neutral connector, each AC power controller including two thyristors; and a quenching arrangement including a single series connection of a capacitor and a parallel circuit having a number of parallel-connected quenching switches, the number of quenching switches corresponding to the number of phases, wherein the capacitor of the quenching arrangement is connected on one side to the number of parallel-connected quenching switches of the series connection and on the other side to a number of parallel-connected diodes, the number of parallel-connected diodes corresponds to the number of phases, wherein each of the parallel-connected diodes is connected to one phase of the multiphase electric circuit on one side of the thyristors of the AC power controllers, wherein each of the parallel-connected quenching switches of the quenching arrangement is connected to one phase of the multiphase electric circuit on the other side of the thyristors of the AC power controllers, and the capacitor is connected to a diode bridge, the method comprising:

charging the capacitor via the diode bridge;

switching one of the quenching switches into its conductive state; and driving a current over the quenching switch by the capacitor.

14. The method according to claim 13, further comprising interrupting a connection between a power supply and a stator of an asynchronous generator, wherein the asynchronous generator is connected to the power supply grid on a stator side, the asynchronous generator is connected to the power supply grid on a rotor side via a rotor-side converter, an intermediate circuit and a grid-side converter.

15. A method for shutting down a current in a multiphase electric circuit having an AC power controller configured to conduct current provided in each phase of the multiphase electric circuit, the phases of the multiphase electric circuit being connected to two voltage systems, each of the voltage systems having a neutral point and the neutral points of the two voltage systems are not connected to each other by way of a neutral connector, wherein each AC power controller includes two thyristors; and a quenching arrangement including a single series connection of a capacitor and a parallel circuit having a number of parallel-connected quenching switches, the number of quenching switches corresponding to the number of phases, wherein the capacitor of the quenching arrangement is connected on one side to the number of parallel-connected quenching switches of the series connection and on the other side to a number of parallel-connected diodes, the number of parallel-connected diodes corresponds to the number of phases, wherein each of the parallel-connected diodes is connected to one phase of the multiphase electric circuit on one side of the thyristors of the AC power controllers, wherein each of the parallel-connected quenching switches of the quenching arrangement is connected to one phase of the multiphase electric circuit on the other side of the thyristors of the AC power controllers, the method comprising:

charging the capacitor by simultaneously switching one of the quenching switches and one of the thyristors of one of the AC power controllers having the same direction, into their conductive states;

switching one of the quenching switches into its conductive state; and driving a current over the quenching switch by the capacitor.

16. The method according to claim 15, further comprising interrupting a connection between a power supply and a stator of an asynchronous generator, wherein the asynchronous generator is connected to the power supply grid on a stator side, the asynchronous generator is connected to the power supply grid on a rotor side via a rotor-side converter, an intermediate circuit and a grid-side converter.

\* \* \* \* \*